United States Patent

Fujita et al.

[11] Patent Number: 5,209,662
[45] Date of Patent: May 11, 1993

[54] RIDING SIMULATION SYSTEM OF MOTORCYCLE

[75] Inventors: Isao Fujita; Takaji Mukumoto; Toshihiro Hijikata; Takashi Ichizawa; Kazuyuki Iwata, all of Saitama; Yukio Miyamaru; Hirotoshi Kizawa, both of Tokyo; Katsuhito Aoki, Saitama; Keigo Yoshida, Saitama; Goro Yamasaki, Saitama; Hiroshi Ohtsuka, Saitama; Hitoshi Kashiwagi, Saitama, all of Japan

[73] Assignee: Honda Giken Kogyo Kabushiki Kaisha, Tokyo, Japan

[21] Appl. No.: 928,687

[22] Filed: Aug. 12, 1992

Related U.S. Application Data

[63] Continuation of Ser. No. 545,525, Jun. 28, 1990, abandoned.

[30] Foreign Application Priority Data

| Jun. 30, 1989 | [JP] | Japan | 1-166931 |
| Jun. 18, 1990 | [JP] | Japan | 2-158939 |
| Jun. 18, 1990 | [JP] | Japan | 2-158940 |
| Jun. 18, 1990 | [JP] | Japan | 2-158941 |
| Jun. 18, 1990 | [JP] | Japan | 2-158942 |
| Jun. 18, 1990 | [JP] | Japan | 2-158943 |
| Jun. 18, 1990 | [JP] | Japan | 2-158944 |
| Jun. 28, 1990 | [JP] | Japan | 2-170582 |

[51] Int. Cl.⁵ .......................................... G09B 9/058
[52] U.S. Cl. ............................ 434/61; 434/69; 434/307; 364/358; 273/85 G; 273/442; 273/DIG. 28; 340/705; 358/104

[58] Field of Search .................. 434/55, 57, 61, 62, 434/69, 307; 364/578; 482/1, 57, 902; 273/85 G, 148 B, DIG. 28, 442; 340/705, 727; 358/103, 104

[56] References Cited

U.S. PATENT DOCUMENTS

| 4,464,117 | 8/1984 | Foerst | 434/69 X |
| 4,752,836 | 6/1988 | Blanton et al. | 358/104 X |
| 4,887,967 | 12/1989 | Letovsky et al. | 434/61 |

FOREIGN PATENT DOCUMENTS

| 154689 | 7/1986 | Japan . | |
| 1688 | 1/1987 | Japan . | |
| 02-32380 | 9/1989 | Japan | 434/61 |
| 8806776 | 9/1988 | World Int. Prop. O. | 272/73 |

Primary Examiner—Richard J. Apley
Assistant Examiner—Joe Cheng
Attorney, Agent, or Firm—Lyon & Lyon

[57] ABSTRACT

A riding simulation system of motorcycle provides at least a model motorcycle on which a person can ride and which can be operated by a person. In response to the operation and movement of the person who rides on the model motorcycle, the model motorcycle is moved by a movable mechanism in a desirable direction such as a yawing direction, a rolling direction and a pitching direction. Preferably, the moving image such as the scenery which is seen from the running motorcycle is displayed in front of the person who rides on the model motorcycle. Such moving image is varied in response to the driving condition of the model motorcycle.

16 Claims, 19 Drawing Sheets

INITIAL STATE

ACCELERATION

DECELERATION

UP/DOWN PITCHING MOVEMENT

FRONT-TIPPED STATE

REAR-TIPPED STATE

FIG. 9a.    FIG. 9b.    FIG. 9c.
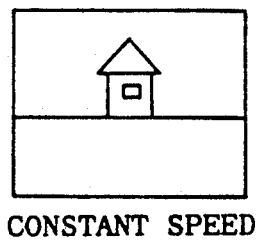
CONSTANT SPEED
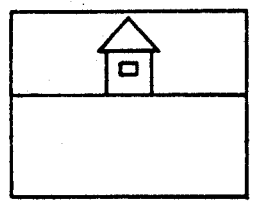
ACCELERATION
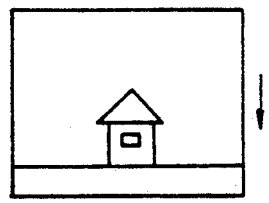
DECELERATION
FIG. 11.
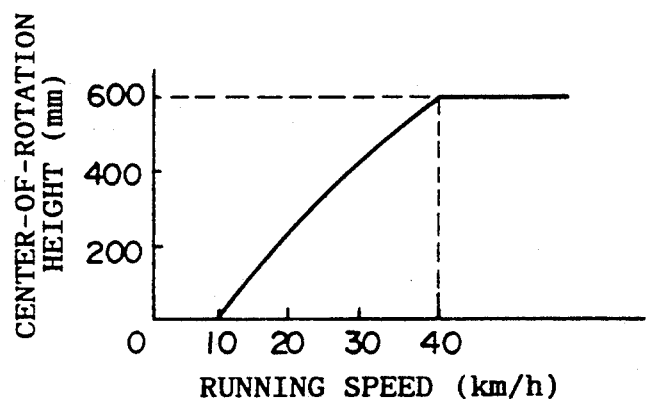
FIG. 12a.    FIG. 12b.
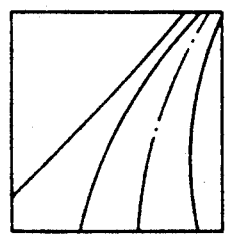  

INITIAL STATE

ACCELERATION

DECELERATION

UP/DOWN PITCHING MOVEMENT

FRONT-TIPPED STATE

REAR-TIPPED STATE

RIDING SIMULATION SYSTEM OF MOTORCYCLE

This is a continuation of U.S. Patent Application Ser. No. 07/545,525, filed Jun. 28, 1990, now abandoned.

BACKGROUND OF THE INVENTION

1. Field of the Invention

The present invention relates to a riding simulation system of motorcycle which carries out a riding simulation by use of a model motorcycle on which a person can ride.

2. Prior Art

Conventionally, there is provided a riding simulation system used for the amusement which contains the model motorcycle and CRT display, for example. By varying the display image, the game-player can enjoy the riding simulation game. In order to further improve the riding feeling, Japanese Patent Laid-Open Publication No. 61-154689 and Japanese Utility Model Laid-Open Publication No. 62-1688 are invented, wherein the rider can freely lean the model motorcycle in leftward or rightward direction.

In the above-mentioned conventional riding simulation system, the model motorcycle is designed to be leaned in response to variation of the center-of-gravity of the model motorcycle on which the rider rides. In general, when the rider intends to change the running condition of the motorcycle into the curving condition, the rider leans the motorcycle to one side so that the center-of-gravity of the rider and motorcycle is varied. However, the conventional system cannot simulate the actual riding feelings corresponding to the turning manner, acceleration and deceleration, running attitude of the motorcycle and the like.

SUMMARY OF THE INVENTION

It is accordingly a primary object of the present invention to provide a riding simulation system of motorcycle which can simulate the riding feelings of the real motorcycle with accuracy so that this system can be used for the driving education of motorcycle in addition to the amusement.

In a first aspect of the present invention, there is provided a riding simulation system of motorcycle comprising:

(a) a movable carriage mounted on a base, the movable carriage being capable of moving in forward, backward, rightward, leftward, upward and downward directions respectively;

(b) driving means for driving the movable carriage to move in a desirable direction;

(c) a model motorcycle on which a person can ride and which can be operated by the person, the model motorcycle being mounted on the movable carriage; and (d) control means for controlling the driving means in response to operation and movement of the person who rides on the model motorcycle to thereby control a yawing movement, a rolling movement and a pitching movement of the model motorcycle, wherein a center-of-rotation in the rolling movement of the model motorcycle is raised as a running speed of the model motorcycle becomes higher.

In a second aspect of the present invention, there is provided a riding simulation system of motorcycle comprising:

(a) a movable carriage mounted on a base, the movable carriage being capable of moving in forward, backward, rightward, leftward, upward and downward directions respectively;

(b) driving means for driving the movable carriage to move in a desirable direction;

(c) a model motorcycle on which a person can ride and which can be operated by the person, the model motorcycle being mounted on the movable carriage;

(d) a display unit provided in front of the model motorcycle, the display unit displaying images corresponding to pre-stored image signals; and (e) control means for controlling the driving means in response to operation and movement of the person who rides on the model motorcycle to thereby control a yawing movement, a rolling movement and a pitching movement of the model motorcycle, the control means controlling the image signal to thereby vary the image displayed by the display unit in response to a simulated running state of the model motorcycle.

wherein the control means controls the display unit such that a horizon of the image displayed by the display unit is rotated by an angle corresponding to increase of a rolling angle of the model motorcycle in a direction inverse to a rolling direction of the model motorcycle.

In a third aspect of the present invention, there is provided a riding simulation system of motorcycle comprising:

(a) a movable carriage mounted on a base, the movable carriage being capable of moving in forward, backward, rightward, leftward, upward and downward directions respectively;

(b) driving means for driving the movable carriage to move in a desirable direction;

(c) a model motorcycle on which a person can ride and which can be operated by the person, the model motorcycle being mounted on the movable carriage;

(d) running environment reproducing means for reproducing a running environment by producing and imparting at least one of sound, vibration and wind to the person who rides on the model motorcycle; and (e) control means for controlling the driving means in response to operation and movement of the person who rides on the model motorcycle to thereby control a yawing movement, a rolling movement and a pitching movement of the model motorcycle, wherein a simulated running speed of the model motorcycle is computed based on a throttle operation and a gear position so that the control means controls the running environment reproducing means in response to the simulated running speed to be computed.

In a fourth aspect of the present invention, there is provided a riding simulation system of motorcycle comprising:

(a) a model motorcycle on which a person can ride and which can be operated by the person;

(b) rolling means for rolling the model motorcycle in a left-lean or right-lean direction;

(c) pitching means for pitching the model motorcycle in upward or downward direction;

(d) yawing means for yawing the model motorcycle in a left-turn or right-turn direction;

(e) driving means for driving the rolling means, the pitching means and the yawing means independently; and (f) control means for controlling the driving means in response to operation and movement of the person who rides on the model motorcycle to thereby control a yawing movement, a rolling movement and a pitching movement of the model motorcycle.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIGS. 9A-C and 12A,B show display images which are controlled by the first embodiment;

FIG. 11 is a graph showing the relationship between the simulated running speed of motorcycle and center-of-rotation in the rolling movement;

DESCRIPTION OF THE PREFERRED EMBODIMENTS

[A] FIRST EMBODIMENT

Figure 1:
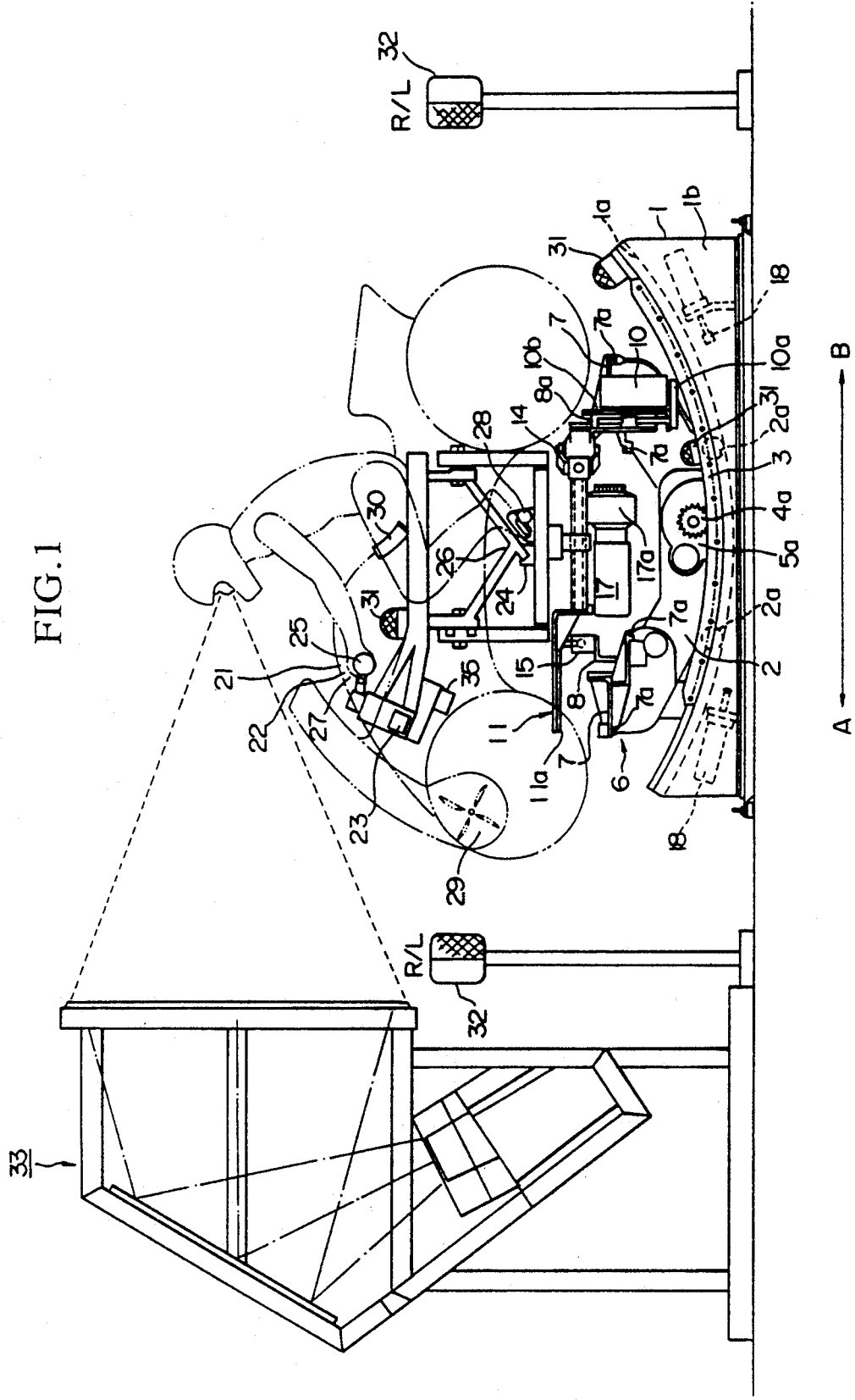
FIG. 1 is a side view showing the construction and mechanism of the riding simulation system of motorcycle according to a first embodiment of the present invention.
Figure 2:
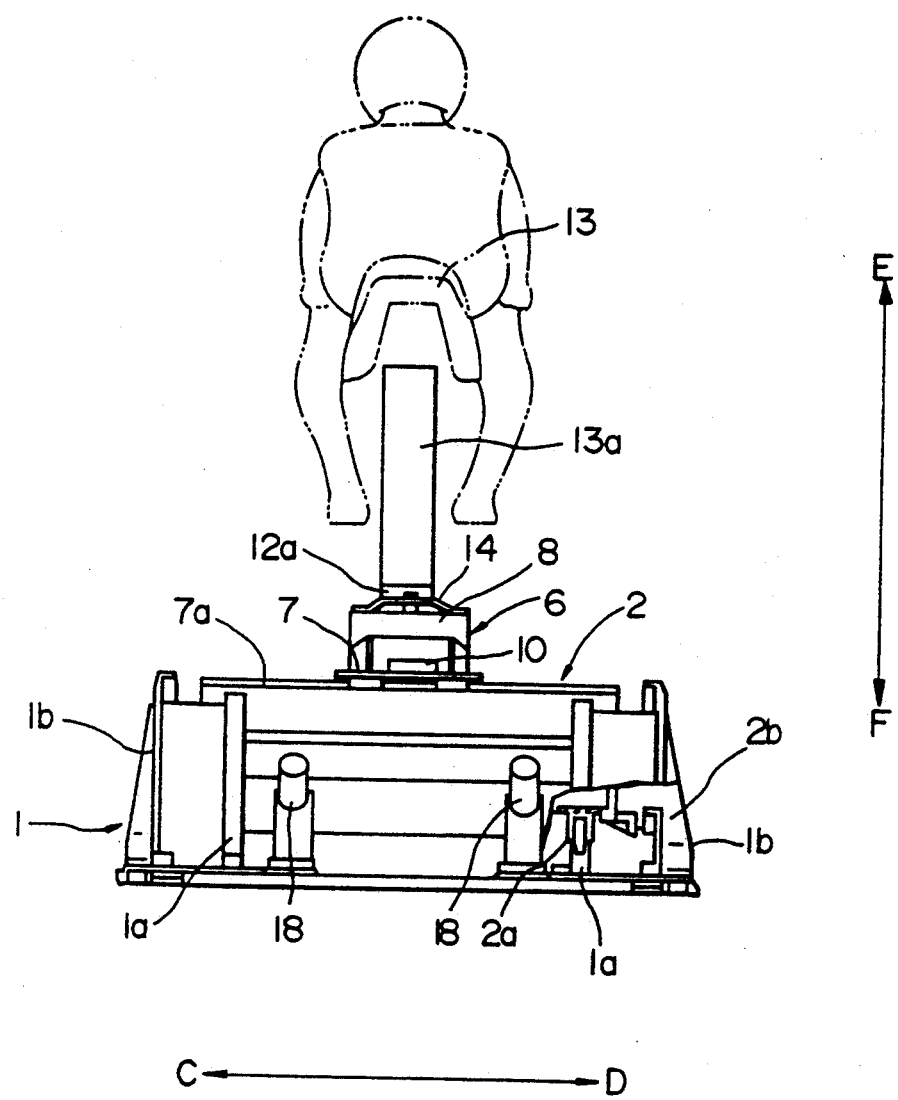
FIG. 2 is a backside view of the first embodiment.
Figure 3:
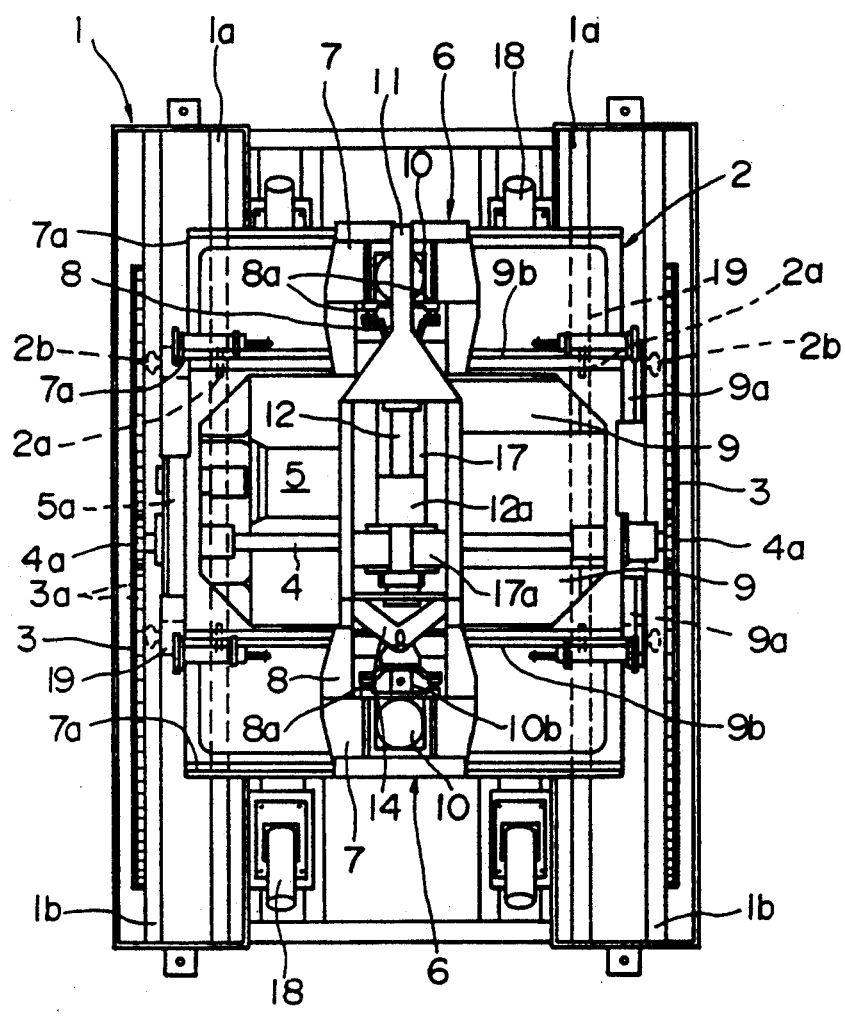
FIG. 3 is a plan view showing the first embodiment from which the model motorcycle is removed.

Referring now to the drawings, wherein like reference characters designate like or corresponding parts throughout the several views, FIGS. 1 to 4 show mechanical construction of a riding simulation system of motorcycle according to a first embodiment of the present invention.

In FIGS. 1 to 4, 1 designates a base, and 2 designates a movable carriage. Herein, the movable carriage 2 is supported by the base 1 in such a manner that the movable carriage 2 can freely move in forward and backward directions (i.e., directions AB in FIG. 1) by wheels 2a placed on a pair of guide-rails 1a formed on the base 1. Herein, both of the base 1 and movable carriage 2 have the symmetric construction, therefore, description will be mainly given with respect to one side construction of the base 1 and movable carriage 2. In the base 1, each of guide-plates 1b is positioned outside each guide-rail 1a. The longitudinal upper edge portion of each guide-plate 1b is curved so that the base 1 itself has a concave shape. Then, a guide-roller 2b is placed in contact with the upper edge portion of the guide-plate 1b. Further, each of racks 3 along which a plurality of pins 3a is disposed is fixed at the outside of the guide-plate 1b. In addition, a drive shaft 4 is placed inside the movable carriage 2, wherein a pair of pinions 4a engaging with the racks 3 are mounted at both edges of this drive shaft 4. This drive shaft 4 is driven by a motor 5 via a gear box 5a provided within the movable carriage 2, so that the drive shaft 4 can be rotated in forward and backward directions. Thus, the movable carriage 2 can be moved along the guide-rails 1a in forward and backward directions. The guide-rail 1a is curved such that both edges thereof are raised upward. Therefore, in response to the forward and backward movement of the movable carriage 2, the movable carriage 2 can be moved upward and downward (i.e., directions EF in FIG. 2) like a rocking chair, for example. Furthermore, a pair of movable mechanisms 6 are mounted at positions corresponding to front and back ends of the model motorcycle 13 within the movable carriage 2, wherein each movable mechanism 6 functions independently to move the model motorcycle 13 in a lateral direction (i.e., directions CD in FIG. 2) and vertical direction (i.e., directions EF in FIG. 2). More specifically, each movable mechanism 6 is constructed by a slide member 7, guide-rails 8a and an elevation frame 8. Herein, the slide member 7 can freely slide along a guide-rail 7a placed on the movable carriage 2 in horizontal direction; the guide-rail 8a is fixed at the slide member 7; and the elevation frame 8 is supported by the guide-rail 8a in such a manner that the elevation frame 8 can freely move in upward and downward directions. In the movable carriage 2, a motor 9 is coupled to a ball screw 9b via a gear box 9a. By revolving the ball screw 9b forward and backward, the slide member 7 is moved rightward and leftward in FIG. 3. On the other hand, a motor 10 mounted on the slide member 7 is coupled to a ball screw 10b via a gear box 10a. By revolving the ball screw 10b forward and backward, the elevation frame 8 is moved upward and downward. Thus, the elevation frame 8 which functions as the moving part of each movable mechanism 6 can be moved in both of the horizontal and vertical directions.

In order to reduce the production cost of the present embodiment, the movable portion of the above-mentioned movable carriage 2 can be omitted such that the non-movable portion of the movable carriage 2 and the base 1 are placed on the ground. In this case, the pitching movement of the model motorcycle 13 can be realized by the pitching movement of the elevation frame 8 which moves upward and downward along the guide-rails 8a.

Figure 4:
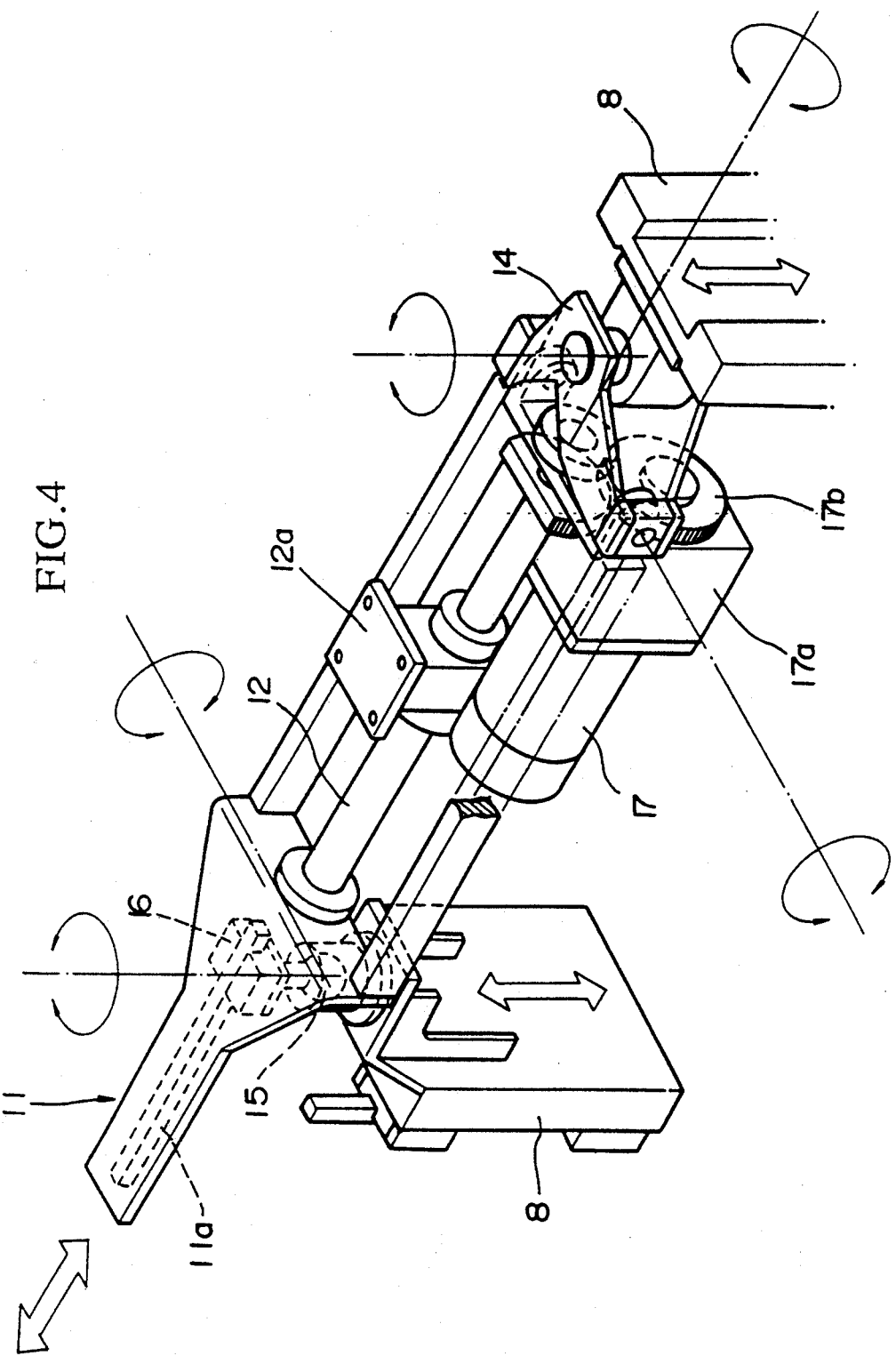
FIG. 4 is a perspective side view showing the support frame portion of the first embodiment.

Between the elevation frames 8 of the movable mechanisms 6, a support frame 11 having the longitudinal shape is mounted. Then, a rolling shaft 12 is provided through the support frame 11. This rolling shaft 12 supports the model motorcycle 13 such that the model motorcycle 13 can freely lean in a left-lean or right-lean direction. In FIG. 4, backside edge of the support frame 11 is connected to the upper portion of the elevation frame 8 of the movable mechanism 6 corresponding to the backside of the model motorcycle 13 via a cross joint 14, while front side edge of the support frame 11 is connected to a linear guide 16 mounted on the upper portion of another elevation frame 8 via a ball joint 15. Herein, the linear guide 16 can freely slide along a guide-rail 11a mounted at under surface of the front side edge of the support frame 11. Thus, in response to the movement of the elevation frame 8 of each movable mechanism 6, the support frame 11 can pitch and now. In addition, a motor 17 is provided under the rolling shaft 12 positioned at the center portion of the support frame 11. This motor 17 is coupled to the rolling shaft 12 via a reduction gear 17a and a gear 17b, so that the motor 17 can revolve the rolling shaft 12 slowly. Then, a frame 13a of the model motorcycle 13 is mounted on a cradle 12a fixed at the center portion of the rolling shaft 12.

Meanwhile, 18, 19 designate shock absorbers which regulate the moving ranges of the movable carriage 2 and the slide member 7 of each movable mechanism 6.

Next, the model motorcycle 13 is designed to simulate the actual motorcycle. In order to detect operations of the rider, several kinds of sensors which senses operations of the accelerator, handle, brake, clutch, gear-changer etc. and the center-of-gravity to be varied in response to the riding attitude of the rider are provided in the model motorcycle 13. As such sensors, the model motorcycle 13 provides an acceleration sensor 21, a clutch-lever-angle sensor 22, a handle torque sensor 23, a lean torque sensor 24, a front braking-pressure sensor 25 and a rear braking-pressure sensor 26. In order to simulate the actual driving situation, the model motorcycle 13 provides a gear position switch 28 and several kinds of handle switches 27 such as a riding switch, a dimmer switch, a winker switch, a starter switch, a horn switch, a kill switch.

Figure 5A:
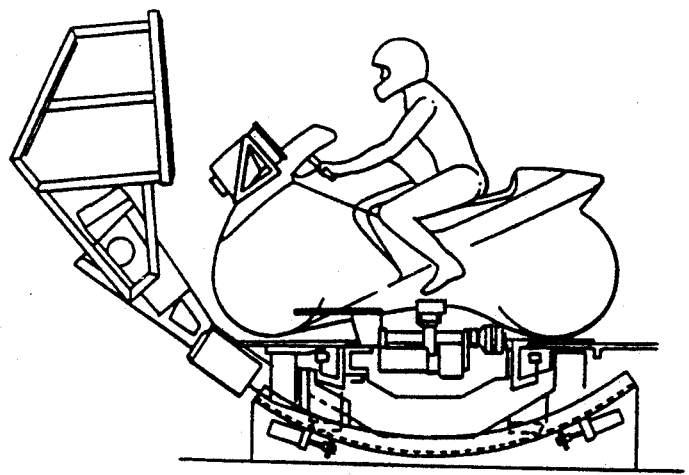
FIGS. 5A-F and 13A-F are side views showing movements of the model motorcycle according to the first embodiment.

In order to simulate the real riding situation with accuracy, the model motorcycle 13 further provides an electric fan 29, vibrators 30 and speakers 31. In order to reproduce the real driving situation with the display image and sounds, four speakers 32 (including two pairs of right-channel and left-channel, R/L, speakers) and a display unit 33. Herein, the speakers 32 are positioned at front and back sides of the motorcycle 13, while the display unit 33 is positioned in front of the motorcycle 13. As shown in FIG. 1, the display unit 33 is provided apart from the base 1 and movable carriage 2. Instead, it is possible to attach the display unit 33 to the movable carriage 2 as shown in FIG. 5A. The arrangement and operation of the display unit 33 are designed such that the rider can easily watch the display image by moving the display screen in response to the movement of the motorcycle 13. Meanwhile, the output signals of the sensors described above are supplied to the computer, by which the display image is varied in response to the driving condition. In addition, by driving the motors 5, 9, 10, 17, the model motorcycle 13 is moved such that the rider can experience the riding operation similar to that of the real motorcycle.

Before describing the above-mentioned simulation control by the computer, diagrammatical description will be given with respect to the whole operation of the present system.

Figure 5B:
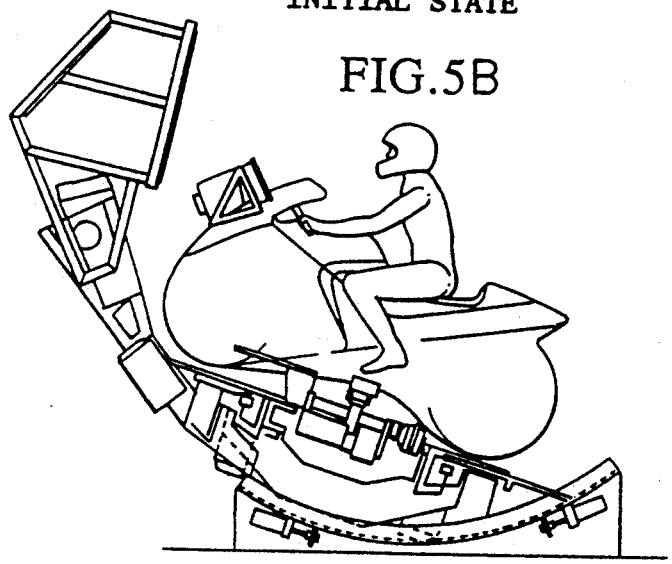
Figure 5C:
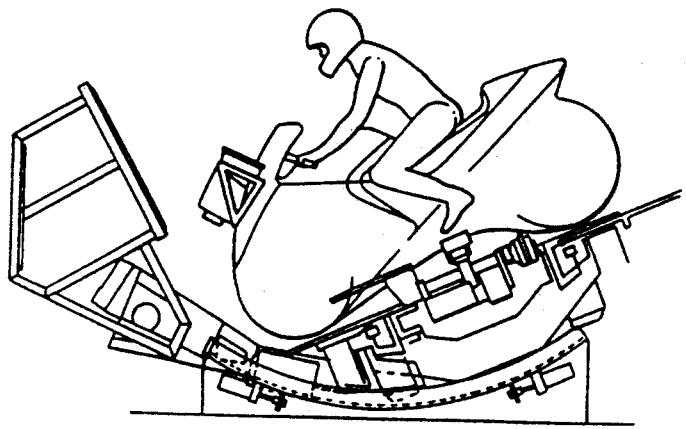

For example, when accelerating or decelerating the model motorcycle 13 by operating the accelerator or brake, the movable carriage 2 is moved in forward and backward directions so that the model motorcycle 13 is to be moved as shown in FIGS. 5B and 5C. In the present embodiment, the model motorcycle 13 is moved in forward and upward directions along with the curved guide-rails 1a when accelerating, while the model motorcycle 13 is moved in backward and upward directions when decelerating. Such movement of the model motorcycle 13 can gives the rider the acceleration and deceleration feelings. When the display image shows that the motorcycle 13 will enter into the corner of road and the rider changes his riding attitude to thereby change the center-of-gravity, the motor 17 drives the rolling shaft 12 so that the motorcycle 13 is leaned toward the right-lean or left-lean direction. In addition, by driving the motors 9, 10 so that both of the slide member 7 and elevation frame 8 are moved, the model motorcycle 13 is elevated up in the leaned direction, resulting that the rider can temporarily feel the centrifugal force when cornering the motorcycle 13.

Figure 5D:
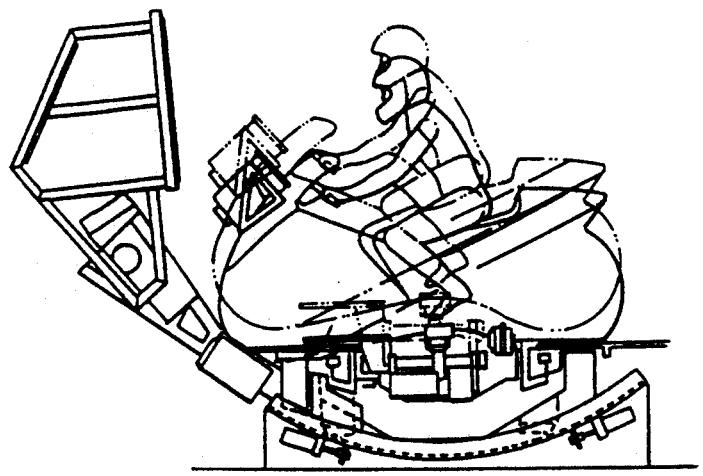
Figure 5E:
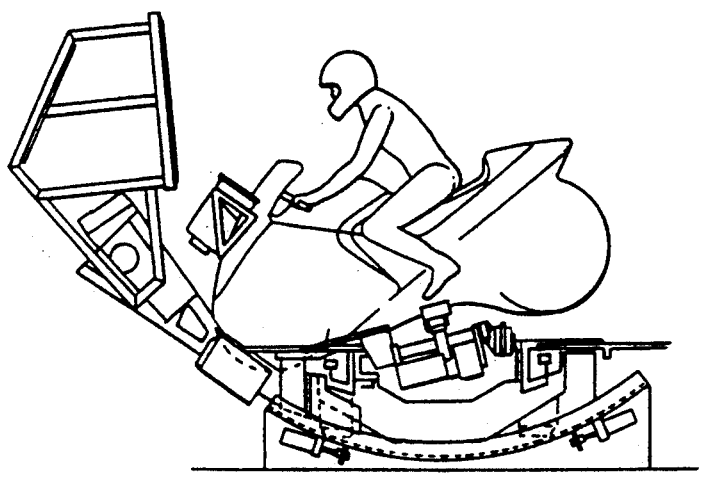
Figure 5F:
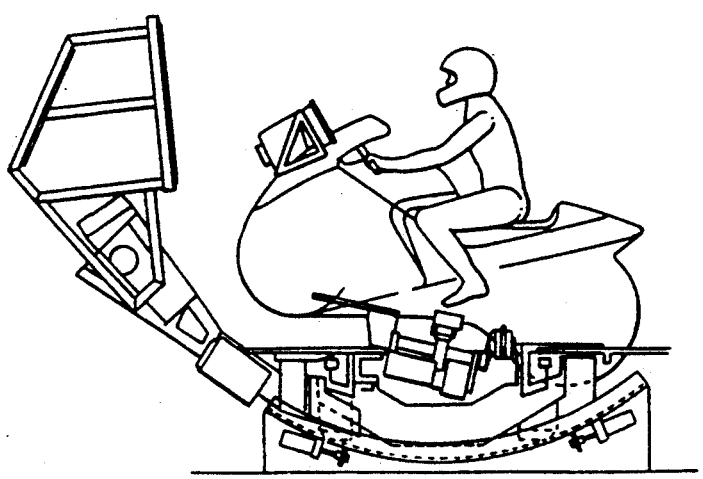

By moving one slide member 7 is moved in rightward direction while the other slide member 7 is moved in leftward direction, the yawing can be applied to the model motorcycle 13. By independently moving the slide members 7 in rightward and leftward directions, the slipping of the front or rear wheel of the motorcycle 13 can be obtained. By moving the single elevation frame 8 of the movable mechanism 6 in upward or downward direction, the cushion operation of the front or rear wheel of the motorcycle 13 can be embodied as shown in FIG. 5D. Further, as shown in FIGS. 5E, 5F, the motorcycle 13 can be controlled to be set in the front-tipped state and rear-tipped state.

Next, detailed description will be given with respect to the computer control of the present embodiment.

Figure 6:
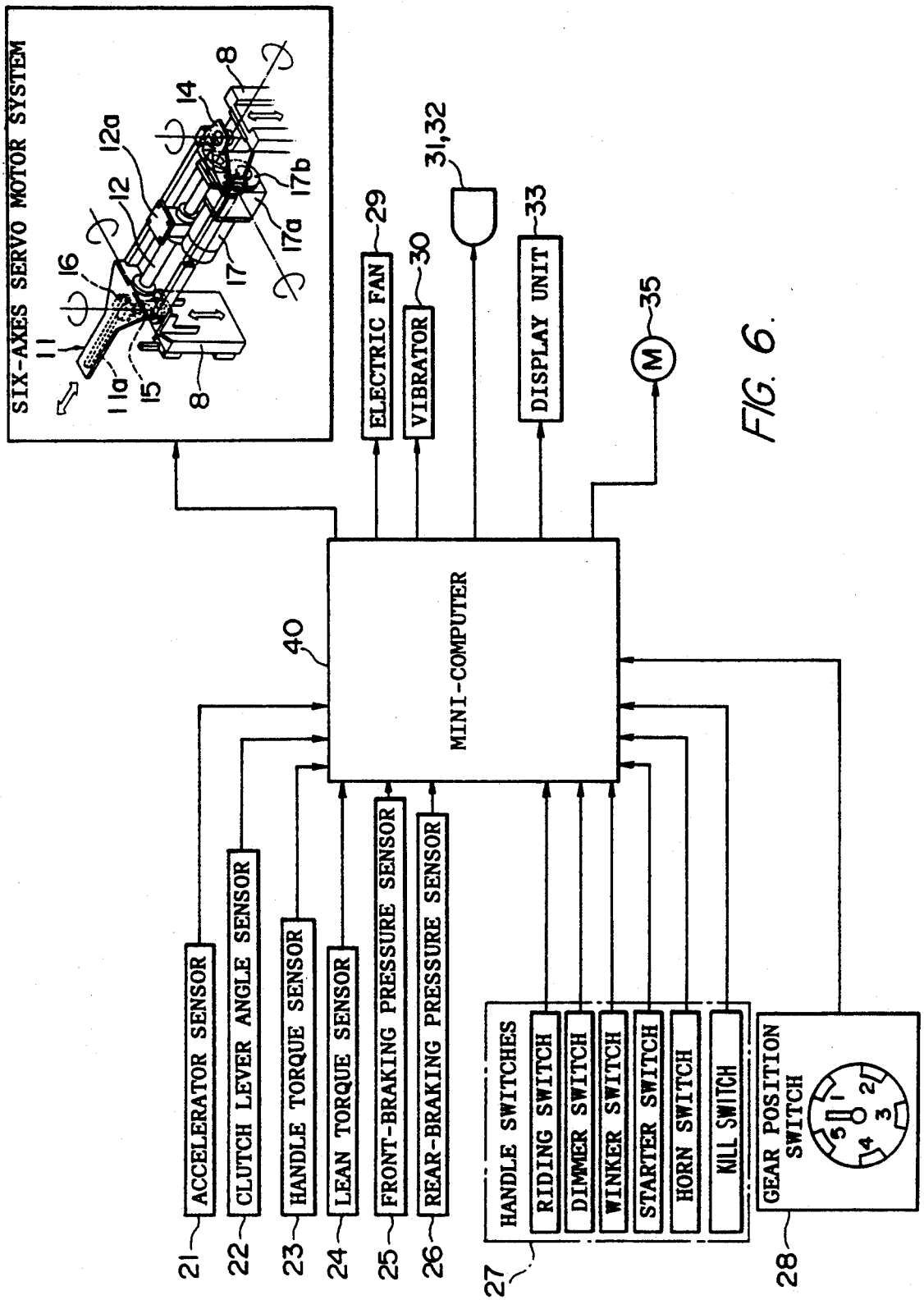
FIG. 6 is a block diagram showing an electric configuration of the first embodiment.
Figure 7A:
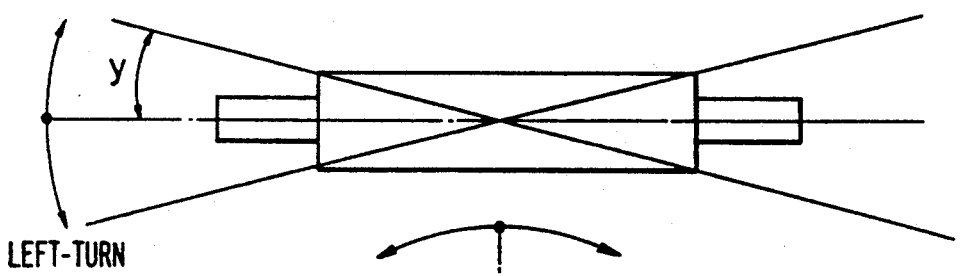
FIG. 7A-C shows the yawing, rolling and pitching movements of the model motorcycle.
Figure 7B:
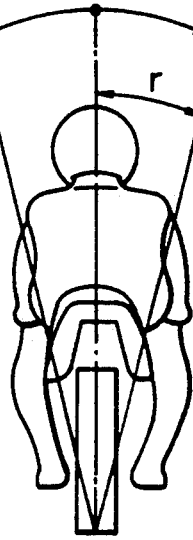
Figure 7C:
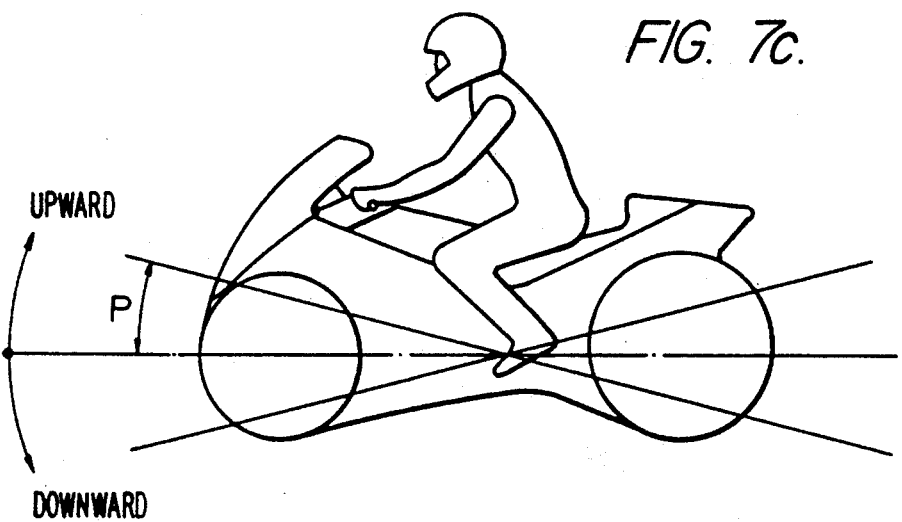

FIG. 6 is a block diagram showing an electric configuration of the riding simulation system of motorcycle according to the first embodiment of the present invention. The output signals of the foregoing sensors and switches 21 to 28 are applied to a mini-computer 40, which is constructed by a central processing unit (CPU), a read-only memory (ROM) or random-access memory (RAM) and the like (not shown). Under control of the mini-computer 40, a six-axes servo motor system for driving the motorcycle 13 as shown in FIG. 4, the electric fan 29, vibrators 30, speakers 31, 32, display unit 33 and a servo motor 35 for assisting the steering are to be activated. The above-mentioned six-axes servo motor system controls the yawing angle "y" (see FIG. 7A), rolling angle "r" (see FIG. 7B) and pitching angle "p" (see FIG. 7C) to be applied to the model motorcycle 13. In addition, the lean torque sensor 24 for detecting the leaning angle of the motorcycle 13 is constructed by the load cell and the like. Thus, the lean torque sensor 24 can output an electric signal corresponding to the stress (i.e., lean torque) which is occurred when leaning the motorcycle 13.

As shown in FIG. 1, there are provided seven speakers including three speakers 31 mounted on the motorcycle 13 and other four speakers 32 arranged in the front and back sides of the motorcycle 13. In order to simulate the real riding condition, the speakers 31 mainly reproduce the lower-pitch sounds, while the other speakers 32 reproduce the higher-pitch sounds. Meanwhile, the revolution speed of the electric fan 29 is controlled by the inverter circuit and the like in proportion to the simulated running speed of the model motorcycle 13. Thus, the wind pressure of the air blown toward the face of the rider by the electric fan 29 is controlled to become larger in response to the increase of the simulated running speed. Similar to the above-mentioned electric fan 29, the vibration produced by the vibrator 30 is controlled to become larger in proportion to the simulated running speed of the motorcycle 13.

Figure 8:
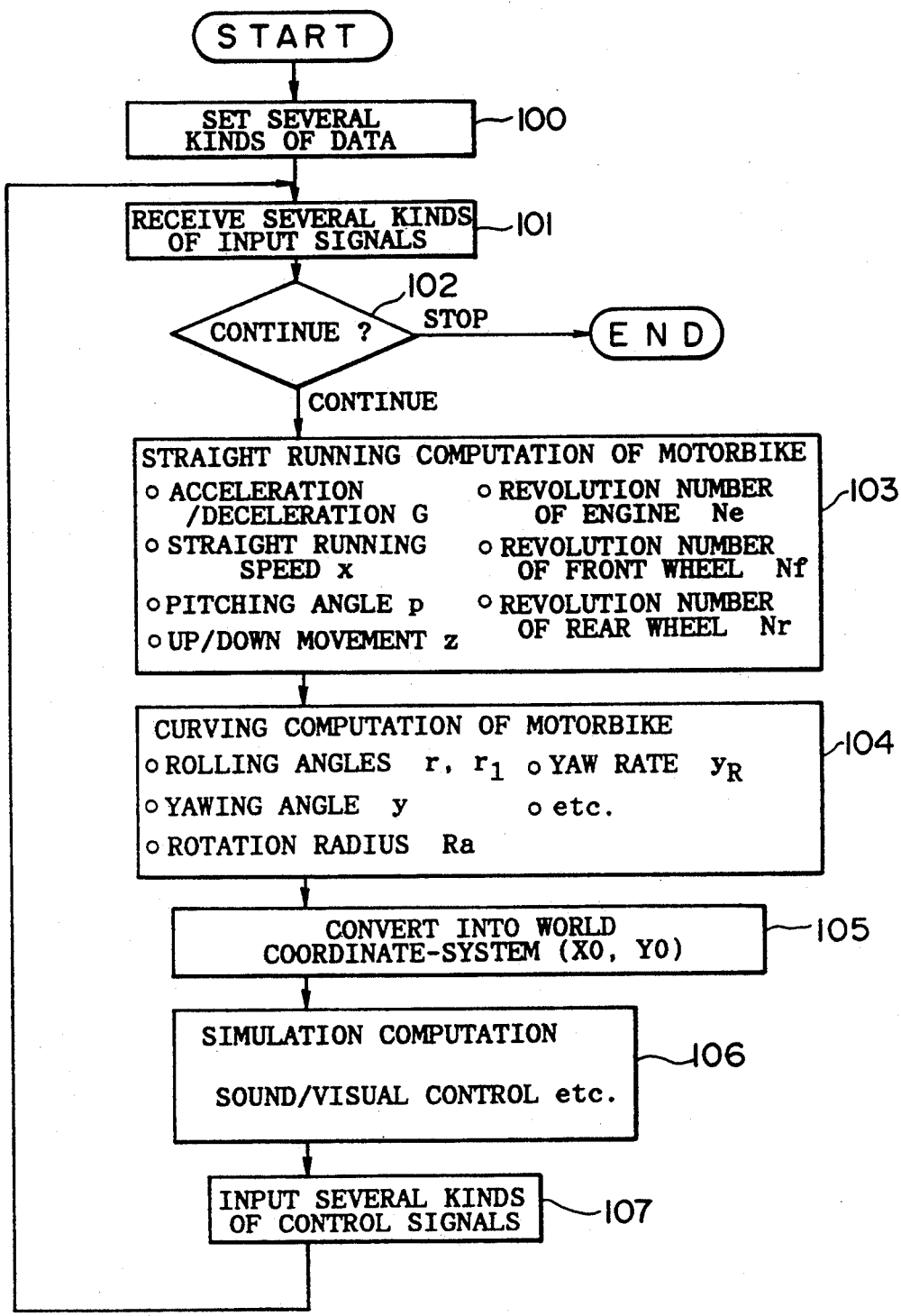
FIGS. 8 and 10 are flowcharts showing the computation processings which are executed by the computer shown in FIG. 6.

FIG. 8 is a flowchart showing the computation which is executed by the foregoing mini-computer 40 when carrying out the running simulation of the model motorcycle 13. In the present embodiment, the running simulation is started under the condition where the motorcycle 13 is running straight, and then the motorcycle 13 is leaned so that the motorcycle 13 is turning. In first step 100, data concerning several kinds of motorcycle running characteristics are set in the mini-computer 40. Then, when the rider starts the running simulation, such start event is detected in step 101. Thereafter, the computation processing enters into step 103 via step 102.

In step 103 where the straight running computation of motorcycle is to be executed, the mini-computer 40 computes the acceleration or deceleration "G", straight running speed "x", pitching angle "p", upward/downward movement "z", revolution number of engine "Ne", revolution number of front wheel "Nf", revolution number of rear wheel "Nr" etc. Such computation is carried out in accordance with the predetermined programs based on the outputs of the sensors in the mini-computer 40. Herein, the mini- computer inputs the information representative of the throttle operation, clutch stroke, gear position, front-braking pressure and rear-breaking pressure. In addition, the data representative of the motorcycle characteristics which is pre-stored in the mini-computer 40 includes, the engine output torque characteristic, brake characteristic, wheel slip ratio, gear deceleration ratio, air resistance, wheel resistance, suspension characteristic, moment of inertia of the wheel, weight of motorcycle and center-of-gravity location of motorcycle.

Figure 13A:
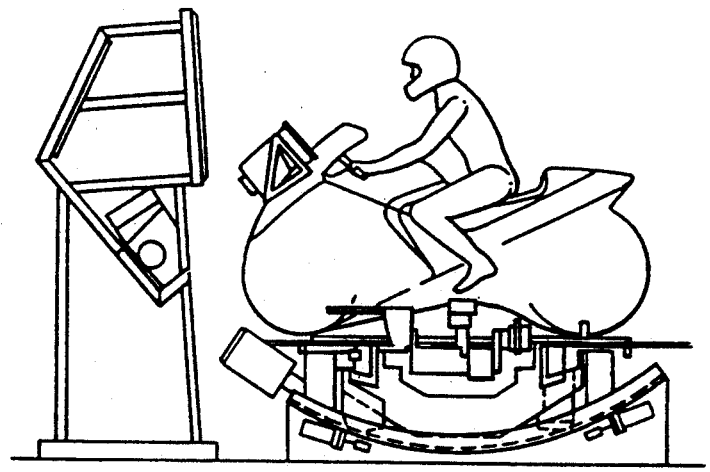
Figure 13B:
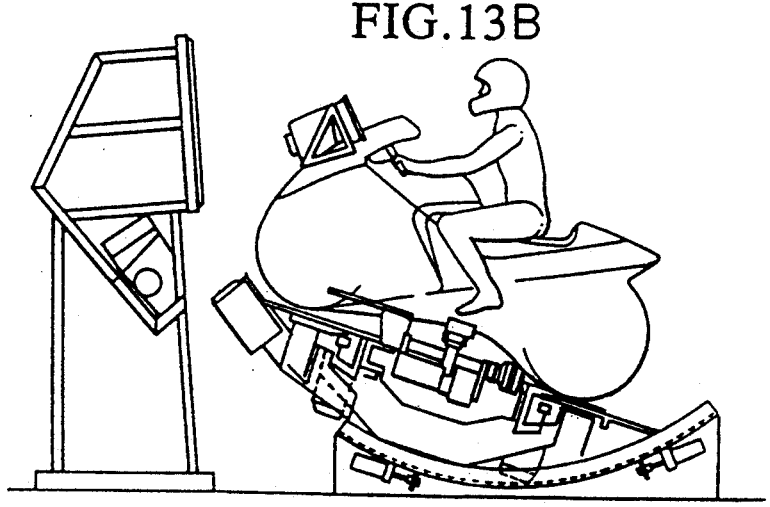
Figure 13C:
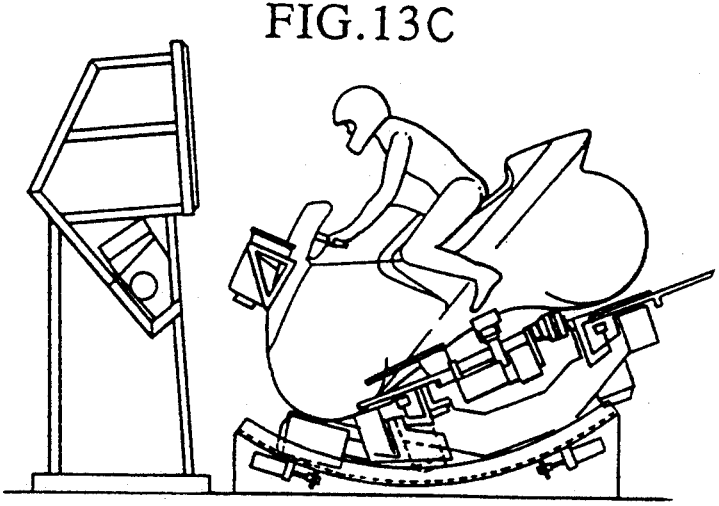
Figure 13D:
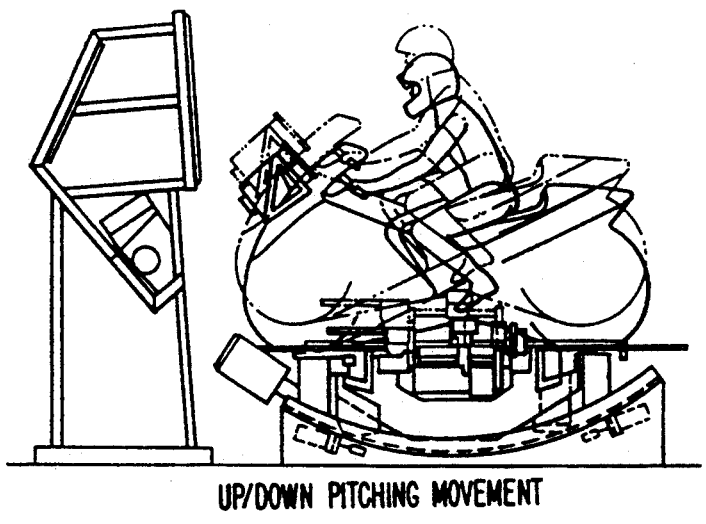
Figure 13E:
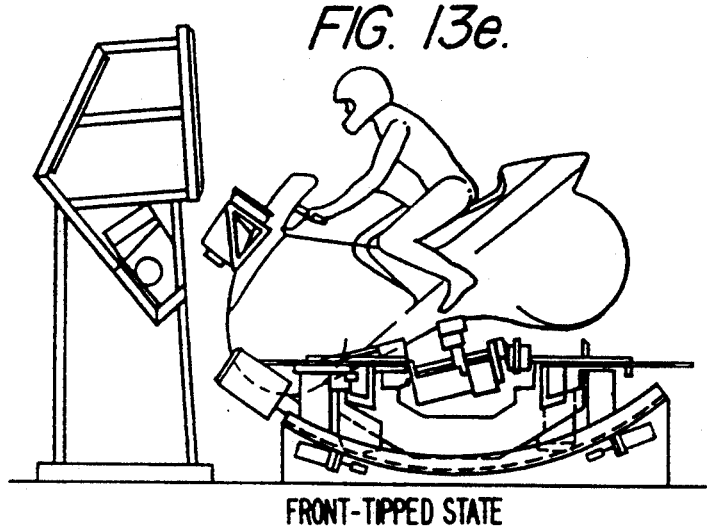
Figure 13F:
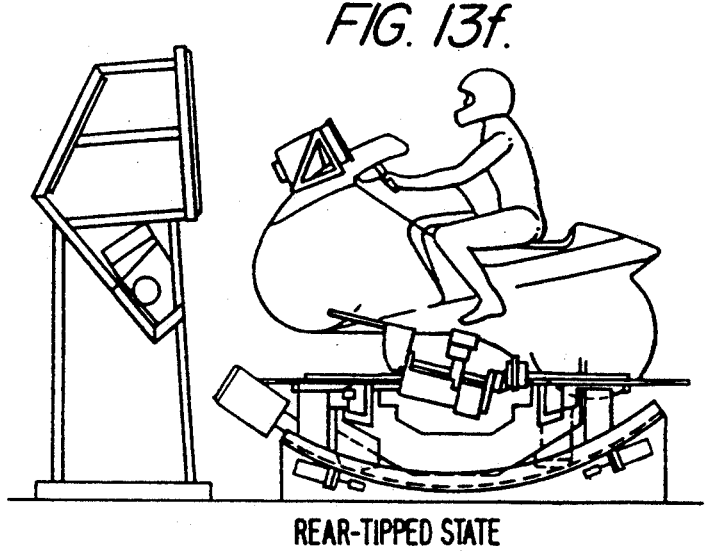

In this case, the foregoing six-axes servo motor system drives the model motorcycle 13 to perform the swing movement in addition to the upward/downward movement so that the rider can feel the acceleration and deceleration. By performing the simple upward/downward movement (see FIG. 5D) or simple front-tipped/-rear-tipped movement (see FIGS. 5E, 5F) at the initial stage of the swing movement of the motorcycle 13, it is possible to further improve the acceleration/deceleration simulation of the motorcycle 13. For such object, the present embodiment varies the image displayed on the display screen of the display unit 33. Normally, the display unit 33 displays the image corresponding to the running speed and direction to be applied to the motorcycle 13 such that the rider feels as if the motorcycle 13 actually ran when riding the model motorcycle 13 which does not run. For example, the display unit 33 displays the scenery which can be seen by the rider when the motorcycle runs about the city and the like. In this case, the display image varies fast when the motorcycle runs at high speed, while the display image varies slowly when the motorcycle runs at low speed. Preferably, the display unit is linked with the model motorcycle as shown in FIG. 5 such that the relative position relationship between the eyes of rider and display screen is not substantially varied. However, in order to reduce the production cost of the present system, the display unit is provided apart from the model motorcycle so that the movable carriage 2 is directly placed on the ground as shown in FIG. 13. In case of FIG. 13, the display image is varied in response to the upward/-downward movement of the eyes of rider which is occurred due to the pitching movement when accelerating or decelerating the model motorcycle 13 as shown in FIGS. 13B, 13C. More specifically, when the eyes of rider is raised up by accelerating the motorcycle, the display image is shifted up as shown in FIG. 9(b) as comparing to the display image at constant speed shown in FIG. 9(a). In contrast, when the eyes of rider is lowered by decelerating the motorcycle, the display image is shifted down as shown in FIG. 9(c). As described above, the display image is shifted up or down in response to the upward/downward pitching movement of the motorcycle accompanying with the acceleration or deceleration. Thus, the rider can feels the simulated acceleration and deceleration without feeling any sense of disharmony with the actual riding condition. Herein, by correcting the display position based on the pitching angle of the eyes of rider and the pitching angle of the model motorcycle 13, the display image is shifted up or down as described above.

Incidentally, the center-of-rotation height in the swing movement of the motorcycle to be accelerated or decelerated as shown in FIGS. 5B, 5C (or FIGS. 13B, 13C) is fixed at the predetermined position. For example, such center-of-rotation height is fixed at the position in the vicinity of the heart of the rider, which is determined through some experiments. According to the experimental result, in order to simulate the acceleration to be actually applied to the head of the rider who drives the real motorcycle, the center-of-rotation height must be lower than the head of the rider but does not depart from the head of the rider. For this reason, the center-of-rotation height is determined as described above.

After executing the straight running computation of motorcycle, the computation processing proceeds to step 104 shown in FIG. 8 wherein the curving computation of motorcycle is to be executed.

Figure 10:
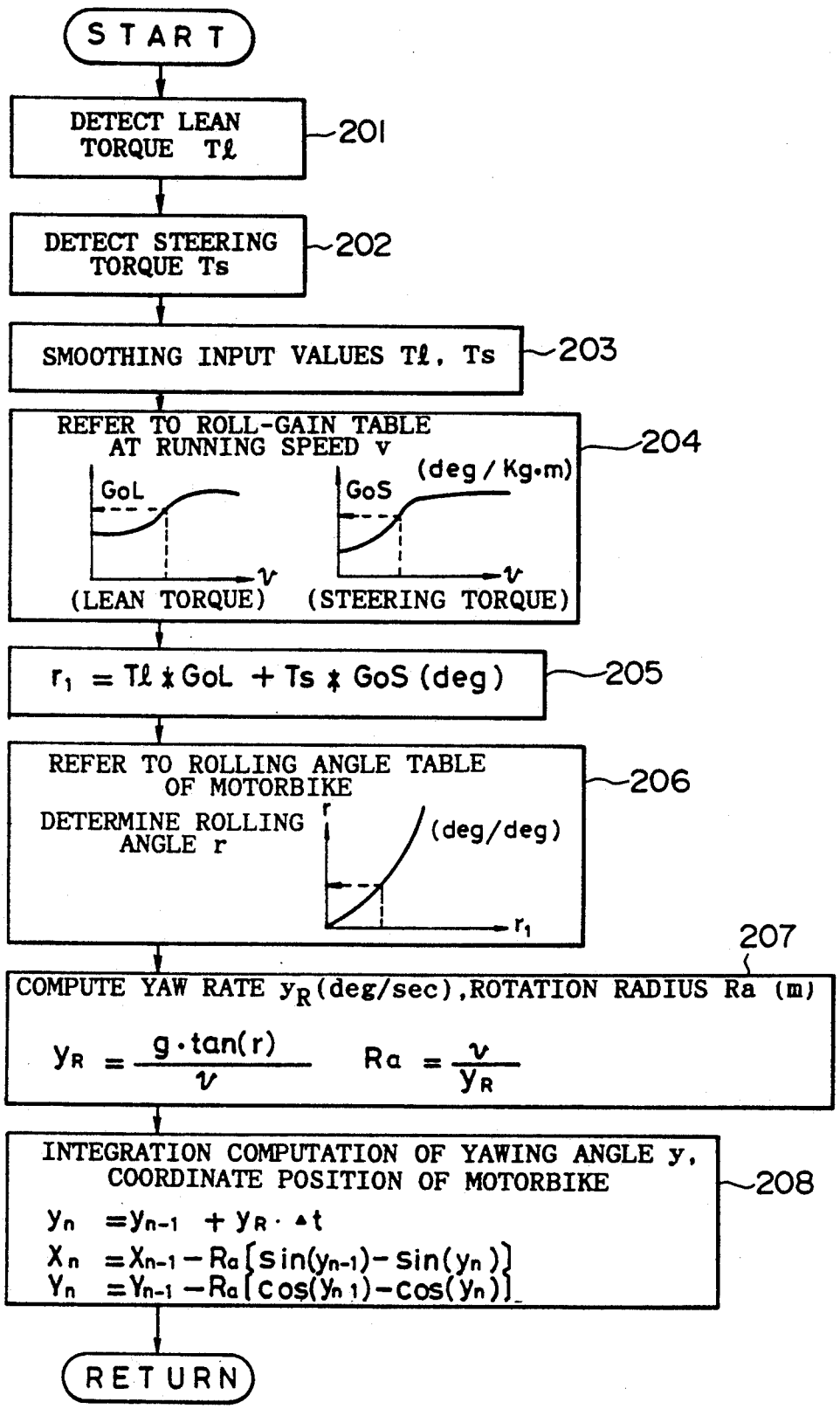

FIG. 10 is a flowchart showing the detailed processings of the curving computation of motorcycle. In steps 201, 202, lean torque Tl and steering torque Ts of the model motorcycle 13 are detected so as to execute the curving computation of motorcycle.

As known well, the center-of-gravity of the motorcycle is changed by varying the riding attitude of the rider when changing the running direction. In other words, when curving the motorcycle, the rider moves the handle and simultaneously changes his riding attitude to change the center-of-gravity of the motorcycle. For this reason, in addition to the steering control, the model motorcycle 13 provides the lean torque sensor 24. As described before, this sensor 24 is constructed by the load cell, which detects the force applied thereto, i.e., change of the center-of-gravity of the motorcycle and rider. Then, the sensor 24 outputs the electric signal corresponding to the detection result. This electric signal is supplied to the mini-computer 40.

Next, description will be given with respect to the steering control of the present system. In order to perform the steering control, both the steering angle and steering force of the handle to be detected can be used. However, the present system uses the steering force to be detected by the handle torque sensor 23 for the steering control. Based on the detected steering force, the steering angle is computed.

As compared to the automobile, the steering angle of the motorcycle is very small. In addition, such steering angle of the motorcycle is differed between the low-speed running state and high-speed running state. More specifically, the steering angle must be large when the motorcycle is running at low speed, while the steering angle becomes smaller when the motorcycle is running at middle or high speed. Thus, extremely high precision must be required for the sensor which directly detects the steering angle. On the other hand, the sensor for detecting the steering force may have the relatively narrow detection range which is lower that 5 Kg, for example. In addition, the sensitivity of the sensor for detecting the steering force is hardly affected by the running speed of motorcycle in general. For the reasons described above, the present embodiment employs the sensor for detecting the steering force. Moreover, by use of such sensor for detecting the steering force, it is possible to drive the model motorcycle which is controlled in response to the detected lean torque even if the rider drives the motorcycle without controlling the handle by his hands. At this time, the steering force remains at 0 Kg.m but the lean torque is varied in response to the center-of-gravity of the motorcycle corresponding to the riding attitude of the rider. Thus, the above-mentioned hand-off driving of the motorcycle can be reproduced by the present system.

Next, in step 203 shown in FIG. 10, the detected lean torque Tl and steering torque Ts is subject to the smoothing process, by which the noises contained in the detected values are removed. In next step 204, the mini-computer 40 refers to the roll-gain table which is pre-stored. In step 205, the mini-computer 40 computes the rolling angle "$r_l$" in accordance with the following formula (1).

$$r_l = Tl*GoL + Ts*Gos \quad (1).$$

In step 206, the computed rolling angle $r_l$ is corrected by use of the rolling angle table of motorcycle so as to further compute the actual rolling angle r with accuracy. In step 207, the yaw rate $y_R$ (degree/second) is computed by use of the constant g, rolling angle r and running speed v. Further, rotation radius Ra is computed based on the yaw rate $y_R$ as follows.

$$y_R = g*\tan(r)/v \quad (2)$$

$$Ra = v/y_R \quad (3).$$

In step 208, the integration is carried out so as to compute the current yawing angle $y_n$ and x-y coordinates $X_n$, $Y_n$ indicating the currently running position of the motorcycle.

$$y_n = y_{n-1} + y_R*at \quad (4)$$

$$X_n = X_{n-1} - Ra[\sin(y_{n-1}) - \sin(y_n)] \quad (5)$$

$$Y_n = Y_{n-1} + Ra[\cos(y_{n-1}) - \cos(y_n)] \quad (6).$$

In order to simulate the inclination and centrifugal force to be applied to the motorcycle due to its rolling movement, the present embodiment sets the following conditions.

(1) It is preferable to set the normally used rolling angle at 15 degrees or less. Because, if the rolling angle of the model motorcycle becomes larger than 15 degrees, the rider can hardly ride on the model motorcycle. In some cases, the rolling angle of the real motorcycle is inclined by 15 degrees or more. In order to simulate such large rolling angle, the present embodiment inclines the display image in addition to the inclination of the model motorcycle, which will be described later in detail.

(2) The center-of-rotation in the rolling movement is varied in response to the simulated running speed of the model motorcycle. As shown in FIG. 11, the center-of-rotation in the rolling movement is positioned at the ground level when the motorcycle is stopped, while it is gradually raised toward the predetermined upper limit level in response to the simulated running speed of the model motorcycle. Herein, such upper limit level is set at the point which is higher than the ground level by 600 mm.

(3) When the model motorcycle is running at the low speed which is lower than 25 km/h, the yawing movement is made in synchronism with the rolling movement. In this case, the direction of the yawing movement is inverse to that of the rolling movement. For example, when the motorcycle is rolled in right-turn direction shown in FIG. 7B, the yawing movement is made in left-turn direction shown in FIG. 7/A. Herein, the center-of-rotation of the yawing movement is set at certain position just below the rider's hips. Meanwhile, when the simulated running speed is raised higher than 40 km/h, the above-mentioned synchronization between the rolling movement and yawing movement is canceled.

Next, in step 105 shown in FIG. 8, the coordinates $(X_n, Y_n)$ which is computed by the curving computation of motorcycle as described above is converted into the world coordinate system (X0, Y0). This world coordinate system corresponds to the data representative of the world map and its scenery. Based on the current world coordinate, the corresponding scenery is displayed by the display unit 33. In step 106, computation of simulation quantity and variation quantity and generation of audio sounds and the like are carried out in order to control the display image. In next step 107, the mini-computer 40 controls the model motorcycle, display unit etc. based on several kinds of control signals which are computed as described above.

Next, description will be given with respect to the display unit. As the display unit, it is possible to employ several kinds of display systems such as the CRT display and primary-color projector which projects the light of primary colors to the screen. In advance, the moving picture such as the scenery which can be seen from the moving automobile is taken and the corresponding image information is stored. Then, the moving picture to be displayed is varied in response to the simulated running condition of the model motorcycle. Thus, the display is controlled such that the rider of the model motorcycle can feel as if he rides on and drives the real motorcycle.

For example, in the case where the rider changes his riding attitude and varies the center-of-gravity of the motorcycle to thereby roll the motorcycle when cornering, the actual running feeling cannot be obtained by only inclining the horizon of the display image of the display unit. For this reason, the pitching component representative of the pitching angle of the eyes of rider is added to the rolling angle of the motorcycle, wherein the pitching angle is less than 20% of the rolling angle. Thus illustrating a left turn when cornering the motorcycle, the horizon of the display image is lowered in response to the pitching angle of the eyes of rider so that the actual riding feeling can be obtained. Such display control simulates the fact in which the viewpoint of rider is lowered in the cornering event as comparing to the straight running event of motorcycle. As described before, the rolling angle of the model motorcycle is limited for the safety of the rider. In order to compensate such limit of the rolling angle, the horizon of the display image is inclined in the direction inverse to the rolling direction when the rolling angle becomes larger. Thus, the rider can feel that the model motorcycle rolls well as if he rides on the real motorcycle.

[B] SECOND EMBODIMENT

Next, description will be given with respect to the second embodiment of the present invention by referring to FIGS. 14 to 16. Herein, the description concerning the parts identical to those in the foregoing first embodiment is omitted, hence, description will be only given with respect to the parts different from those of the first embodiment.

In the foregoing first embodiment, the model motorcycle 13 as a whole is mounted on the movable carriage 2, and the axes for the yawing movement, rolling movement and pitching movement are arranged within the movable carriage 2. However, such construction complicates the mechanism of the riding simulation system. In order to simplify the construction, the second embodiment cancels the movable carriage.

Figure 14:
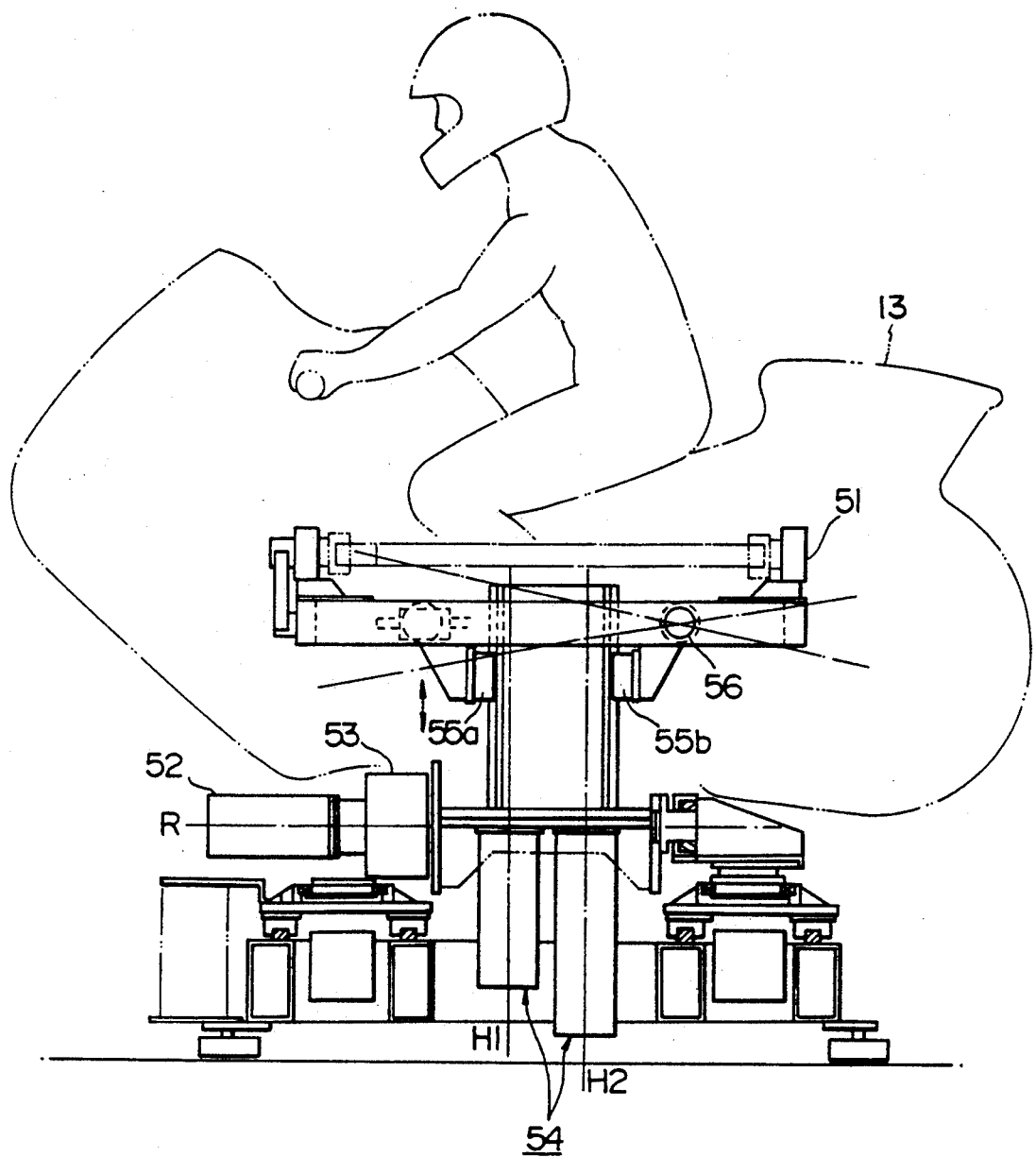
FIGS. 14 to 16 show a riding simulation system of motorcycle according to a second embodiment.

In the second embodiment as shown in FIG. 14, the model motorcycle 13 which is connected to the base via a frame 51 is subject to the rolling movement which is driven by a motor 52 and a gear box 53. Meanwhile, the model motorcycle is driven in upward direction by an elevation motor 54. In this case, a pair of bearing members 55a, 55b for transmitting the driving force of the elevation motor 54 are fixed at the frame 51. Herein, the bearing member 55a can slide in upward and downward directions, while another bearing member 55b is coupled to a pitching fulcrum 56. Therefore, the model motorcycle 13 is subject to the pitching movement by revolving around the pitching fulcrum 56 in response to the driving force of the elevation motor 54.

Figure 15:
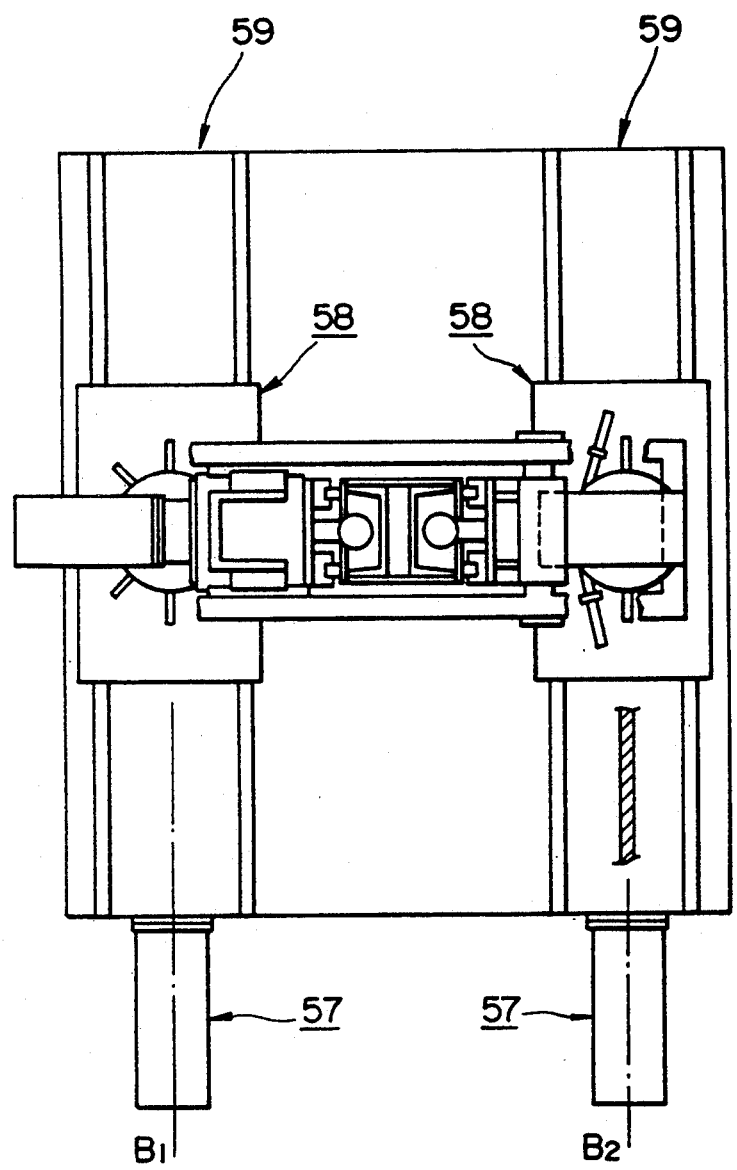
Figure 16:
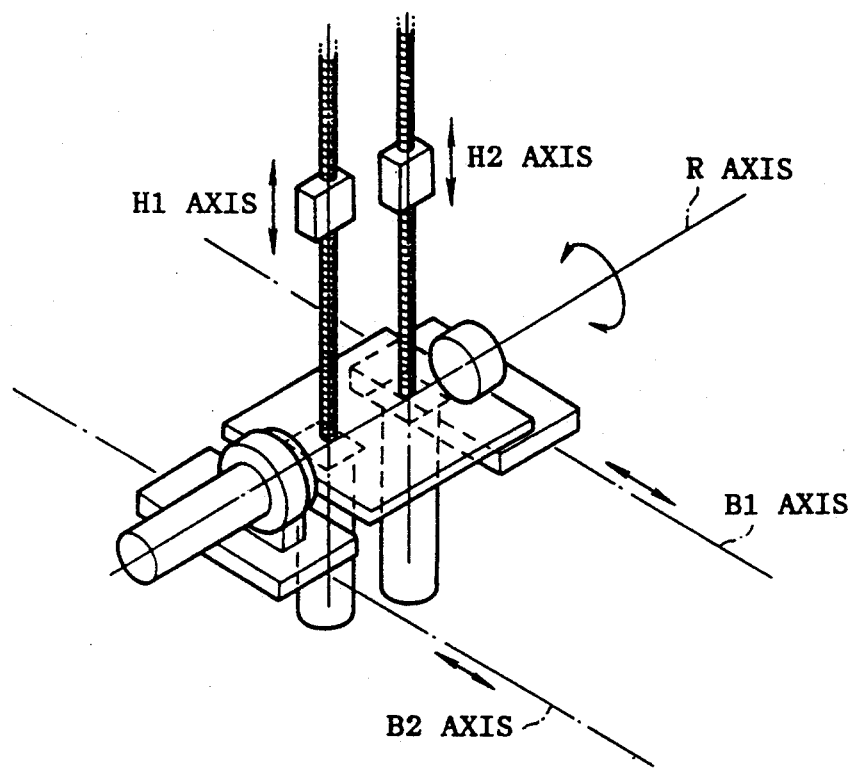

Meanwhile, the yawing movement is performed in response to the driving forces of a pair of motors 57 shown in FIG. 15. More specifically, by driving these motors 57 in different directions respectively, plates 58 on which both wheels of the model motorcycle 13 are fixed slide along rails 59 in different directions respectively so that the yawing movement can be obtained. As comparing to the first embodiment, the rails 59 exclusively used for the yawing movement are arranged perpendicular to the center axis of the model motorcycle 13, so that the second embodiment can obtain the longer stroke (i.e., larger movable range) in the yawing direction. In the second embodiment, the relationship between $H_1$, $H_2$ axes for the pitching movement, rolling axis R and $B_1$, $B_2$ axes for the yawing movement is set as shown in FIG. 16.

[C] THIRD EMBODIMENT

Figure 17:
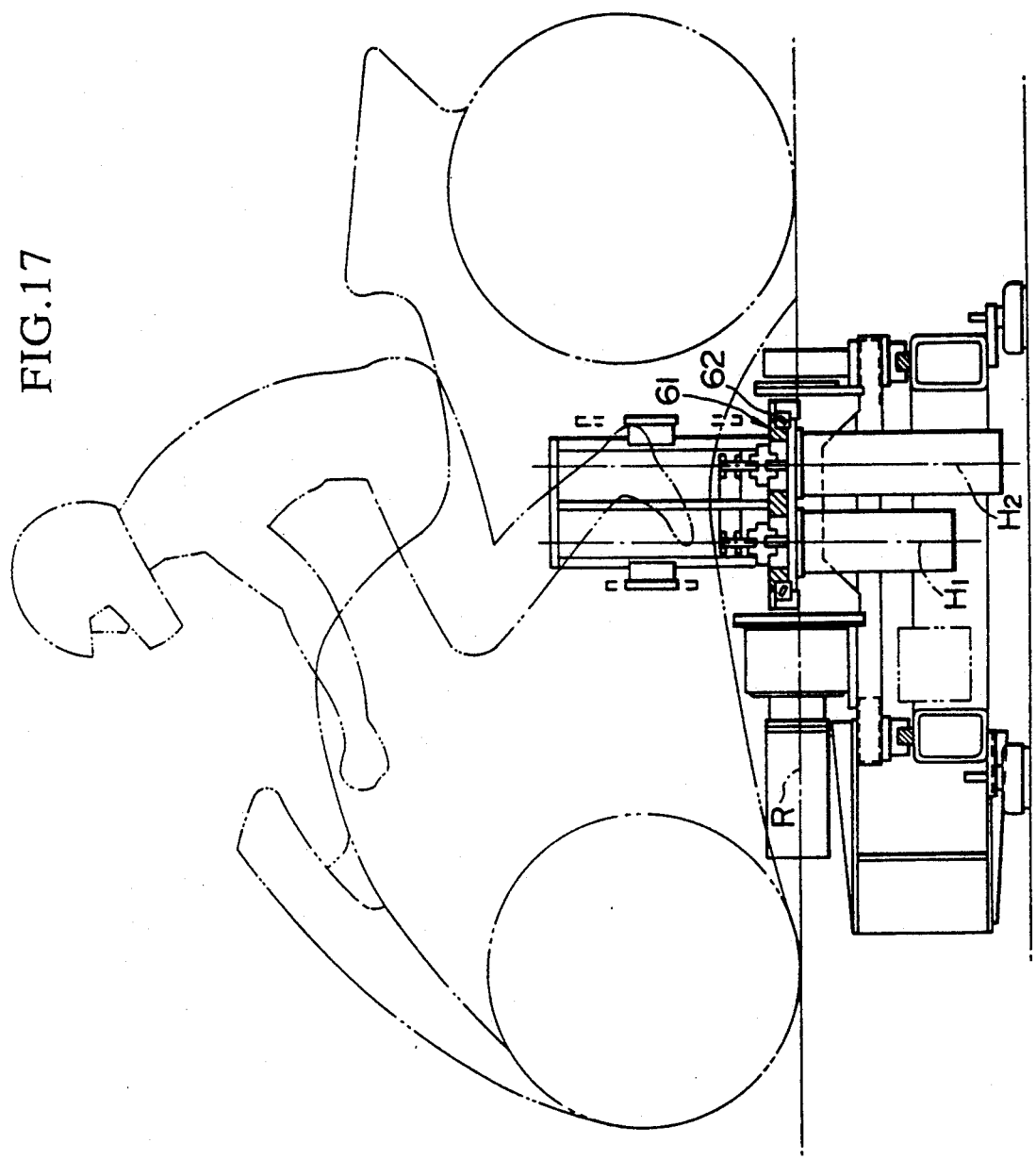
FIGS. 17 to 19 show a riding simulation system of motorcycle according to a third embodiment.
Figure 18:
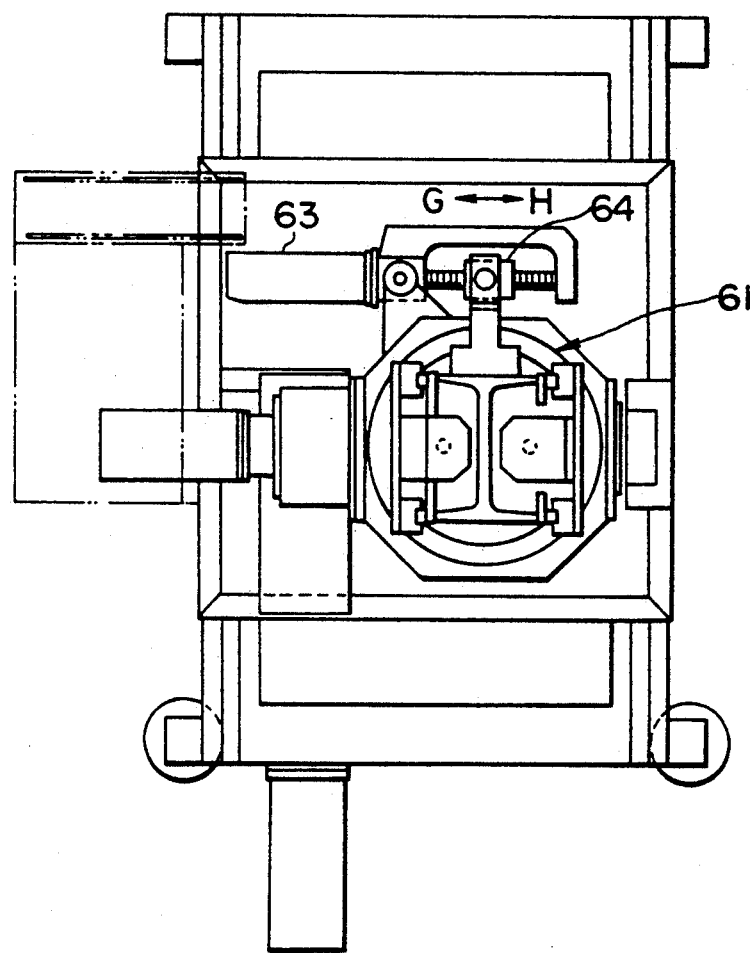
Figure 19:
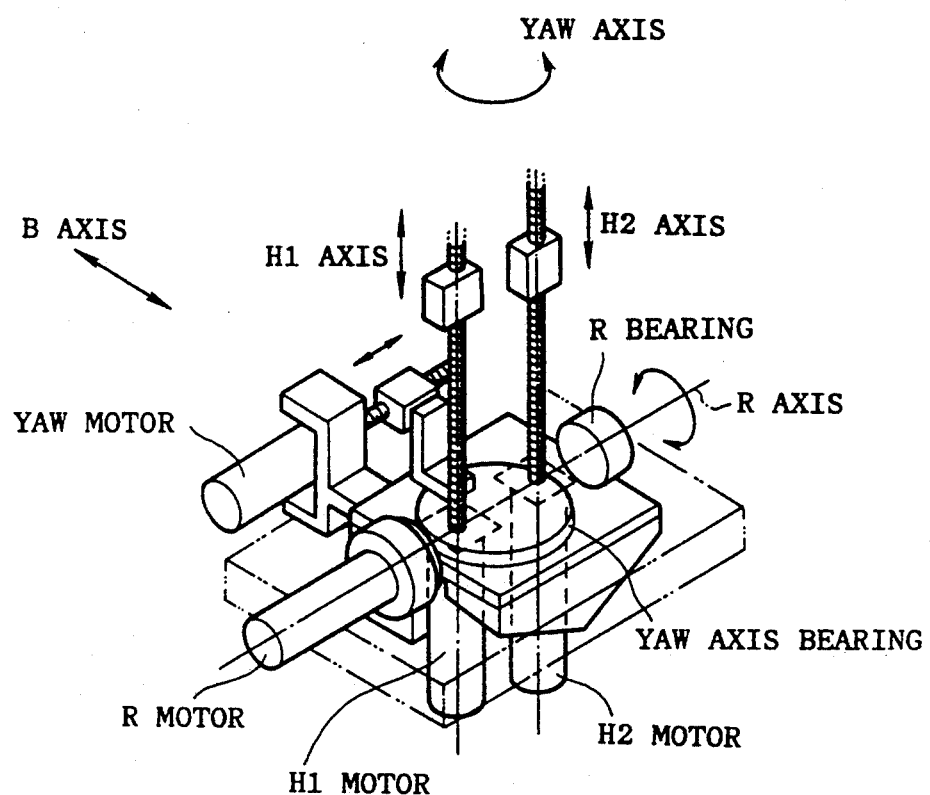

As comparing to the above-mentioned second embodiment, the third embodiment is characterized by providing a rotary table 61 for the yawing movement (see FIGS. 17, 18). This rotary table 61 is mounted to the base via a cross-roller bearing 62. In this case, driving force of a yaw motor 63 is transmitted to the rotary table 61 via a slide member 64. Thus, the rotary table 61 rotates in directions GH shown in FIG. 18. As a result, the yawing movement can be obtained by the rotary table 61. Herein, the relationship between the moving directions and axes is as shown in FIG. 19.

Incidentally, the center-of-rotation in the yawing movement is positioned just below the hips of rider, for example.

The preferred embodiments of the present invention are constructed and controlled as described heretofore. However, this invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A motorcycle riding simulation system to be ridden on by a person, comprising:
   (a) a base and a movable carriage mounted on said base;
   (b) driving means for driving said movable carriage to move in a desirable direction;
   (c) a model motorcycle having model controls, on which the person can ride and which can be operated by the person, said model motorcycle being mounted on said moveable carriage;
   (d) detecting means for sensing operation of the model motorcycle including operation of said model controls by the person; and
   (e) control means for controlling said driving means in response to said detecting means to thereby control a rolling movement about a center-of-rotation and a pitching movement of said model motorcycle, said control means raising said center-of-rotation with a simulated increase in running speed of said model motorcycle sensed by said detecting means.

2. A riding simulation system as defined in claim 1 wherein the center-of-rotation in the rolling movement of said model motorcycle is raised from a ground level toward a predetermined height in response to increase of the running speed of said model motorcycle, thereafter, the center-of-rotation being fixed at the predetermined height after the running speed of said model motorcycle becomes higher than a predetermined speed.

3. A motorcycle system to be ridden on by a person, comprising:
   (a) a base and a moveable carriage mounted on said base;
   (b) driving means for driving said moveable carriage to move in a desirable direction;
   (c) a model motorcycle having model controls, on which a person can ride and which can be operated by the person, said model motorcycle being mounted on said moveable carriage;
   (d) a display unit provided in front of said model motorcycle, said display unit displaying images corresponding to pre-stored image signals;
   (e) detecting means for sensing operation of the model motorcycle including operation of said model controls by the person;
   (f) control means for controlling said driving means in response to said detecting means to thereby control a rolling movement and a pitching movement of said model motorcycle, said control means controlling the image signal to thereby vary the image displayed by said display unit in response to a simulated running state of said model motorcycle, wherein said control means controls said display unit such that a horizon of the image displayed by said display unit is rotated by an angle corresponding to increase of a simulated rolling angle of said model motorcycle in a direction inverse to a rolling direction of said model motorcycle when the person rolls said model motorcycle to increase the rolling angle beyond the predetermined simulated rolling angle range.

4. A riding simulation system as defined in claim 3 wherein said control means controls the image signal to thereby move the image displayed by said display unit in a pitching direction in response to the simulated rolling angle of said model motorcycle when said model motorcycle is rolled.

5. A riding simulation system as defined in claim 3 wherein said control means controls the image signal to thereby move the image displayed by said display unit in a pitching direction in response to a simulated acceleration applied to said model motorcycle.

6. A riding simulation system as defined in claim 3 wherein the rolling angle of said model motorcycle is limited in a predetermined rolling angle range when said model motorcycle is rolled, and said control means controlling the image signal to thereby incline the horizon of the image displayed by said display unit in the direction inverse to the rolling direction of said model motorcycle when the person rolls said model motorcycle to increase the stimulated rolling angle beyond the predetermined rolling angle range.

7. A motorcycle riding simulation system to be ridden on by a person, comprising:
(a) a base and a movable carriage mounted on said base;
(b) driving means for driving said movable carriage to move in a desirable direction;
(c) a model motorcycle having model controls, on which the person can ride and which can be operated by the person, said model motorcycle being mounted on said movable carriage;
(d) detecting means for sensing operation of the model motorcycle including operation of said model controls by the person;
(e) control means for controlling said driving means in response to said detecting means to thereby control a rolling movement and a pitching movement of said model motorcycle,
wherein a pitching angle of said motorcycle is varied in response to simulated acceleration and deceleration of said model motorcycle.

8. A riding simulation system as defined in claim 7 wherein said control means controls said driving means such that a center-of-rotation in the pitching movement of said model motorcycle is set in the vicinity of a breast portion of the person who rides on said model motorcycle.

9. A riding simulation system as defined in claim 7 wherein said control means controls the pitching movement of said model motorcycle such that said model motorcycle is inclined up in front when simulating acceleration and said model motorcycle is inclined up in back when simulating deceleration.

10. A motorcycle riding simulation system to be ridden on by a person, comprising:
(a) a base and a movable carriage mounted on said base, said movable carriage;
(b) driving means for driving said movable carriage to move in a desirable direction;
(c) a model motorcycle having model controls, on which the person can ride and which can be operated by the person, said model motorcycle being mounted on said movable carriage;
(d) a display unit provided in front of said model motorcycle, said display unit displaying images corresponding to pre-stored image signals; and
(e) detecting means for sensing operation of the model motorcycle including operation of said model controls by the person;
(f) control means for controlling said driving means in response to said detecting means to thereby control a rolling movement and a pitching movement of said model motorcycle, said control means controlling the image signal to thereby vary the image displayed by said display unit in response to a simulated running state of said model motorcycle,
wherein a pitching angle of said model motorcycle is varied in response to simulated acceleration and deceleration of said model motorcycle and said control means simultaneously controls the image signal to thereby vary the image displayed by said display unit in response to the pitching angle of said model motorcycle.

11. A riding simulation system as defined in claim 10 wherein said control means controls the pitching movement of said model motorcycle such that said model motorcycle is inclined up in front when accelerating and said model motorcycle is inclined up in back when decelerating.

12. A motorcycle riding simulation system to be ridden on by a person, comprising:
(a) a base and a movable carriage mounted on said base;
(b) driving means for driving said movable carriage to move in a desirable direction;
(c) a model motorcycle including model controls including a steering handle and on which the person can ride and which can be operated by the person, said model motorcycle being mounted on said movable carriage;
(d) detecting means for sensing operation of the model motorcycle including operation of said model controls by the person;
(e) control means for controlling said driving means in response to said detecting means to thereby control a rolling movement and a pitching movement of said model motorcycle,
wherein operation by the person of said steering handle of said model motorcycle is detected by said detecting means and a simulated steering angle of said model motorcycle is computed by said control means based on said steering handle operation and the simulated speed of said model motorcycle, so that a rolling angle of said model motorcycle is controlled by said simulated steering angle.

13. A model motorcycle riding simulation system to be ridden on by a person, comprising:
(a) a base and a movable carriage mounted on said base;
(b) driving means for driving said movable carriage to move in a desirable direction;
(c) a model motorcycle having model controls on which the person can ride and which can be operated by the person, said model motorcycle being mounted on said movable carriage;
(d) detecting means for sensing operation of the model motorcycle including operation of said model controls by the person;
(e) control means for controlling said driving means in response to said detecting means to thereby control a rolling movement and a pitching movement of said model motorcycle,
wherein a lean torque applied to said model motorcycle in a rolling direction is detected by said detecting means, said control means controlling a rolling angle of said model motorcycle based on said detected lean torque and the simulated speed of said model motorcycle.

14. A riding simulation system as defined in claim 13 wherein said detecting means includes lean torque detecting means between said model motorcycle and a movable portion of said movable carriage which can be moved in the rolling direction at least, whereby lean torque detecting means detects a lean torque applied said model motorcycle in the rolling direction.

15. A riding simulation system as defined in claim 14 wherein said lean torque detecting means is constructed by a load cell which generates an electric signal corresponding to a stress applied thereto in the rolling direction.

16. A riding simulation system as defined in claim 13 wherein when the person inclines said model motorcycle in the rolling direction so that said model motorcycle corners, said control means controls the running attitude of said model motorcycle to cancel the lean torque to be detected.

* * * * *

UNITED STATES PATENT AND TRADEMARK OFFICE
CERTIFICATE OF CORRECTION

PATENT NO. : 5,209,662
DATED : May 11, 1993
INVENTOR(S) : Fujita et al.

It is certified that error appears in the above-indentified patent and that said Letters Patent is hereby corrected as shown below:

In claim 6 (col. 13, l. 17), delete "stimulated".

In claim 6 (col. 13, l. 18), after "predetermined", insert -- simulated --.

In claim 14 (col. 15, l. 5), after "whereby" insert -- said --.

In claim 14 (col. 15, l. 6), after "applied", insert -- to --.

Signed and Sealed this

Thirty-first Day of May, 1994

Attest:

BRUCE LEHMAN

Attesting Officer      Commissioner of Patents and Trademarks